United States Patent [19]
Yoshida et al.

[11] Patent Number: 5,751,458
[45] Date of Patent: May 12, 1998

[54] OPTICAL DOUBLE TRANSMISSION SYSTEM

[75] Inventors: Toshirou Yoshida; Tetsuya Suzuki, both of Tokyo, Japan

[73] Assignee: NEC Corporation, Tokyo, Japan

[21] Appl. No.: 616,595

[22] Filed: Mar. 15, 1996

[30] Foreign Application Priority Data

Mar. 15, 1995 [JP] Japan .................... 7-054853

[51] Int. Cl.$^6$ .................................. H04B 10/12
[52] U.S. Cl. .......................... 359/173; 359/115
[58] Field of Search ...................... 359/110, 113, 359/115, 133, 173, 179, 188, 181, 195

[56] References Cited

U.S. PATENT DOCUMENTS

| | | |
|---|---|---|
| 5,291,326 | 3/1994 | Heidemann ............... 359/110 |
| 5,390,185 | 2/1995 | Hooijmans et al. ....... 359/124 |
| 5,510,919 | 4/1996 | Wedding .................. 359/115 |

*Primary Examiner*—Kinfe-Michael Negash
*Attorney, Agent, or Firm*—Ostrolenk, Faber, Gerb & Soffen, LLP

[57] ABSTRACT

Disclosed is an optical double transmission system for transmitting a digital optical signal output from an optical transmitter through an optical fiber cable to an optical receiver, wherein: the optical transmitter transmits the digital optical signal multiplex-light-intensity-modulated by a main data signal and a sub-data signal with a clock rate lower than that of the main data signal; and the optical receiver has a photoelectric conversion circuit for converting the digital optical signal into a first electric signal which can include a DC component, a low-pass filter for passing a frequency component lower than that of the main data signal of the first electric signal, an offset cancel circuit for controlling a value of the DC component of the first electric signal to be such that a DC component in the output of the low-pass filter is made zero responding to the output of the low-pass filter, and a sub-data signal reproducing circuit for reproducing the sub-data signal from the output of the offset cancel circuit.

2 Claims, 3 Drawing Sheets

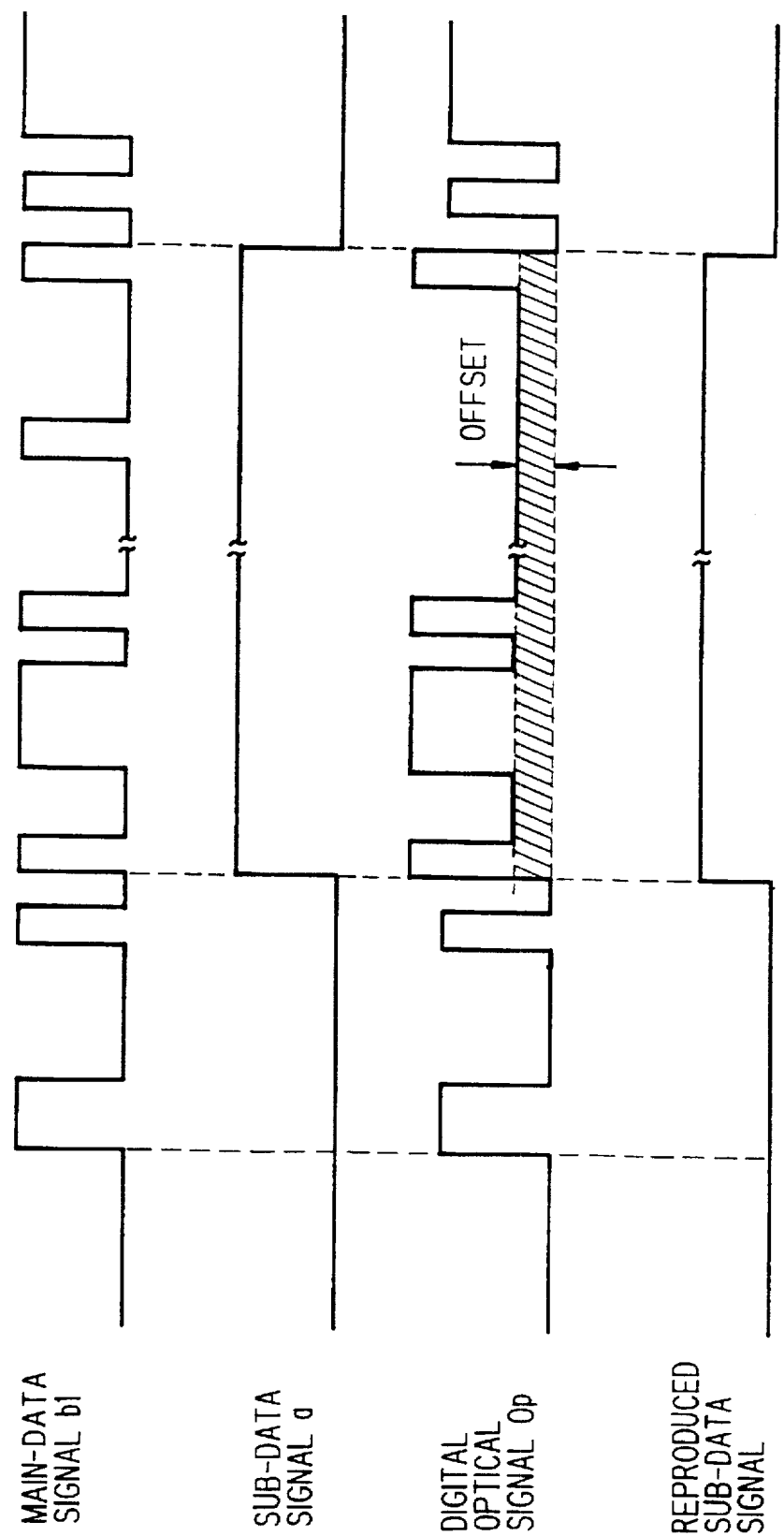

OPTICAL DOUBLE TRANSMISSION SYSTEM

FIELD OF THE INVENTION

This invention relates to an optical double transmission system, and more particularly to, an optical double transmission system in which a main signal and a sub-signal are simultaneously transmitted through an optical fiber cable.

BACKGROUND OF THE INVENTION

In a conventional optical double transmission system that employs wavelength division multiplexing (WDM), two optical signals with different wavelengths are multiplexed to perform the double transmission of a main signal and a sub-signal.

However, the conventional optical double transmission system, to effectively utilize the WDM system, requires a light emitting device for generating the optical signal with stabilized wavelength and a demultiplexer which should be made with a high precision.

Furthermore, the conventional optical double transmission system requires a plurality of the above optical circuits, therefore complicating the composition of the optical circuit and increasing the cost.

SUMMARY OF THE INVENTION

Accordingly, it is an object of the invention to provide an optical double transmission system in which the use of expensive optical circuit is decreased and the composition of an optical circuit is simplified.

According to the invention, provided is an optical double transmission system for transmitting a digital optical signal output from an optical transmitter through an optical fiber cable to an optical receiver, wherein:

the optical transmitter transmits a digital multiplexed light intensity signal which is modulated by a main data signal and a sub-data signal with a clock rate lower than that of the main data signal; and the optical receiver comprises a photoelectric conversion circuit for converting the light intensity signal into a first electric signal which can include a DC component, a low-pass filter for passing a frequency component lower than that of the main data signal of the first electric signal, an offset cancel circuit for controlling a value of the DC component of the first electric signal to be such that a DC component in the output of the low-pass filter is made zero responding to the output of the low-pass filter, and a sub-data signal reproducing circuit for reproducing the sub-data signal from the output of the offset cancel circuit.

BRIEF DESCRIPTION OF THE DRAWINGS

The invention will be explained in more detail in conjunction with the appended drawings, wherein:

FIG. 3 shows a waveform diagram of main signals in the preferred embodiment.

DESCRIPTION OF THE PREFERRED EMBODIMENTS

Before explaining an optical double transmission system in the preferred embodiment, the aforementioned conventional optical double transmission system will be explained in FIG. 1.

Figure 1:
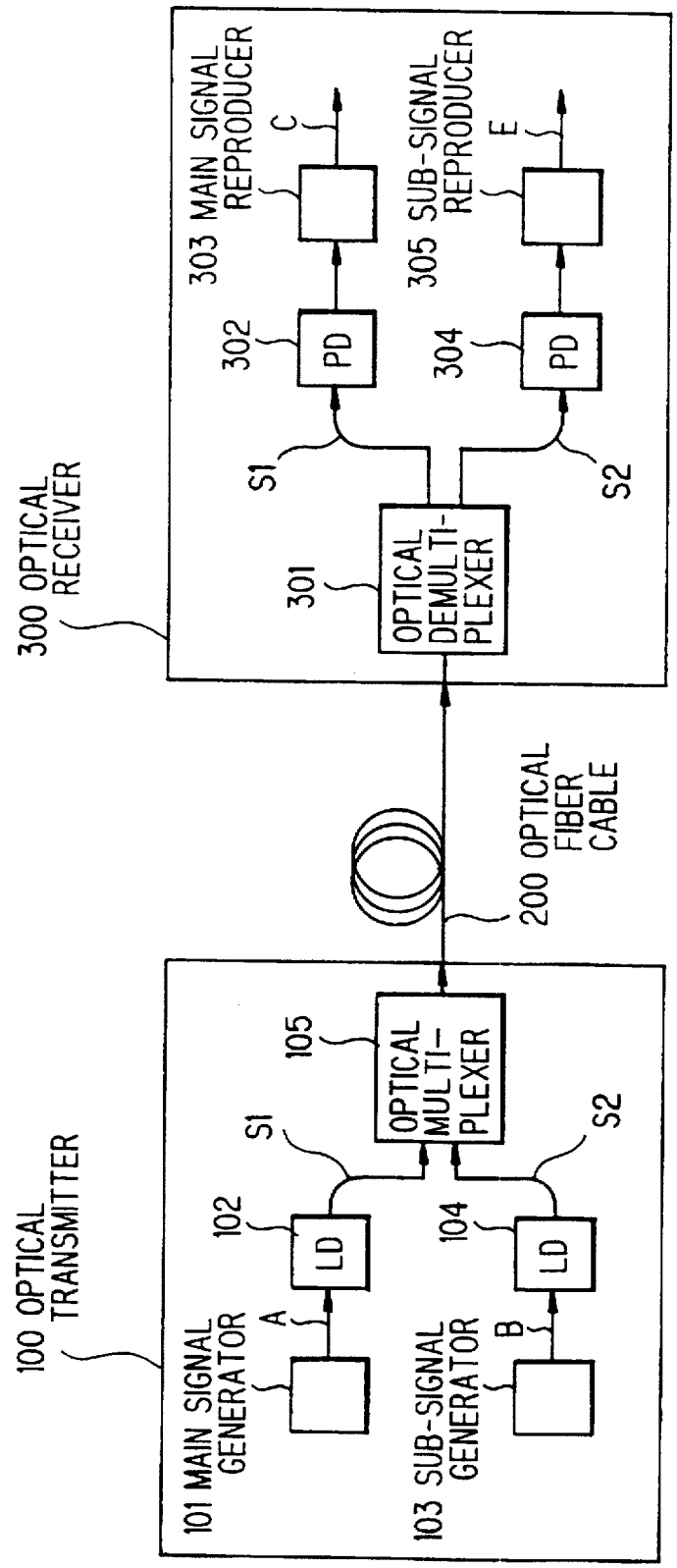
FIG. 1 is a block diagram showing a conventional optical double transmission system.

Referring to FIG. 1, in an optical transmitter 100, a main signal generator 101 generates a main signal A which is a data signal, and then a light emitting device (LD) 102 such as a laser diode produces an optical signal S1 with wavelength of $\lambda 1$ which is light-intensity-modulated by the main signal A. On the other hand, a sub-signal generator 103 generates a sub-signal B such as an alarm signal with a clock rate lower than that of the main signal A, and then a light emitting device (LD) 104 produces an optical signal S2 which is light-intensity-modulated by the sub-signal B and has a different wavelength $\lambda 2$ from $\lambda 1$. The optical signals S1 and S2 are wavelength-multiplexed by an optical multiplexer 105 to be output to an optical fiber 200 and further supplied to an optical receiver 300.

In the optical receiver 300, an optical demultiplexer 301 demultiplexes the multiplexed optical signals S1 and S2. The optical signal S1 is photoelectric-converted into an electric signal by a photo-detector (PD) 302 such as a photodiode. A main signal reproducer 303 reproduces a main reproduction signal C which is to be identical with the main signal A from the electric signal. On the other hand, the optical signal S2 is photoelectric-converted into an electric signal by a photo-detector (PD) 304. A sub-signal reproducer 305 reproduces a sub reproduction signal E which is to be identical with the sub-signal B.

Next, an optical double transmission system in the preferred embodiment will be explained in FIG. 2. FIG. 3 shows a waveform diagram of main signals in the preferred embodiment.

Figure 2:
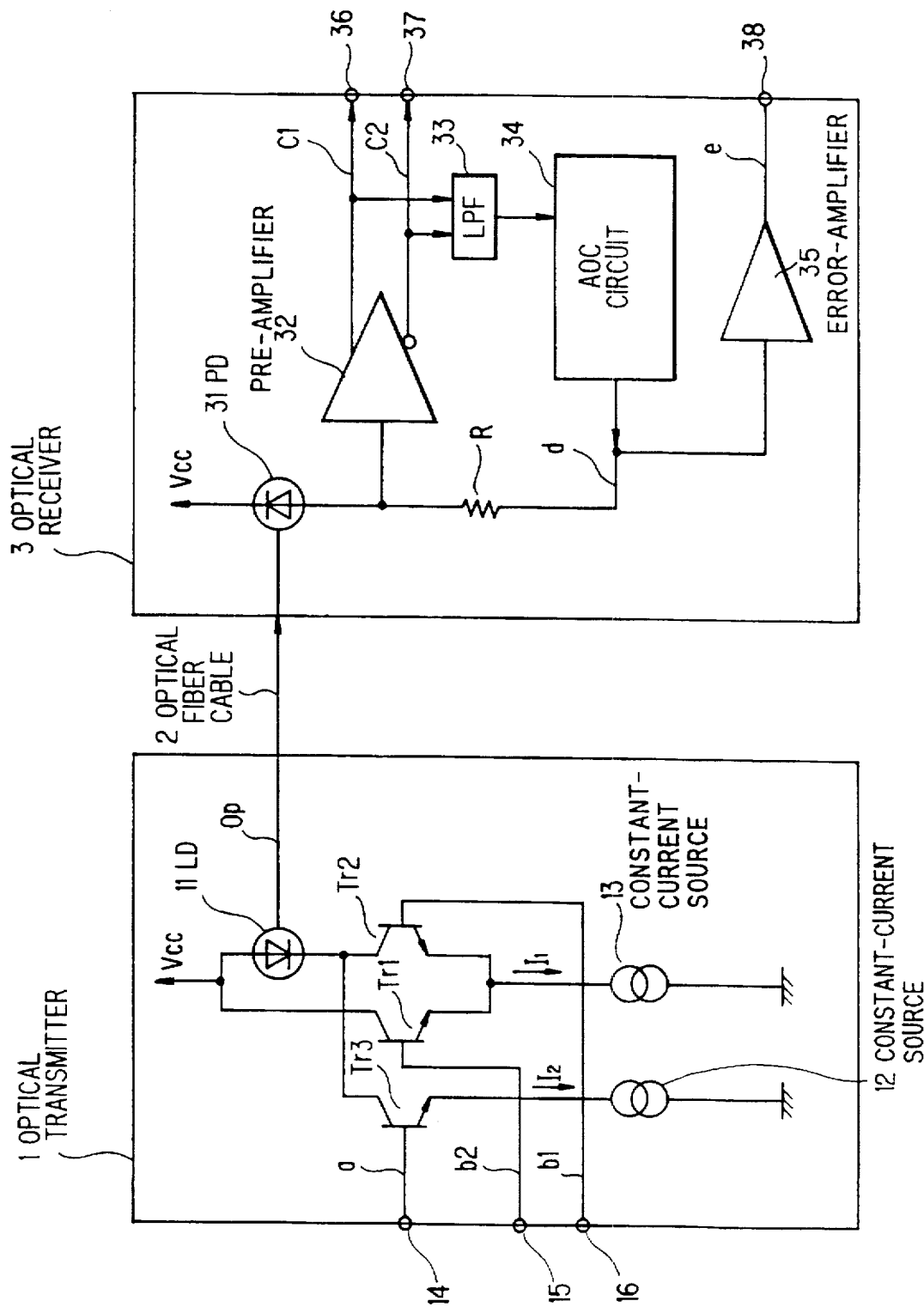
FIG. 2 is a circuit diagram showing an optical double transmission system in a preferred embodiment according to the invention.

Referring to FIG. 2, in the optical double transmission system in the preferred embodiment, a digital optical signal Op which is generated by an optical transmitter 1 and is modulated in light intensity is transmitted to an optical receiver 3 through an optical fiber cable 2.

The optical transmitter 1 receives a main data signal b1 which is a digital signal at a terminal 16, an inversion main data signal b2 which is inverted data of the main data signal b1 at a terminal 15 and a sub-data signal a such as an alarm signal which has a clock rate lower than that of the main data signal b1 at a terminal 14. The optical transmitter 1 outputs the digital optical signal Op which is multiplexed in light intensity to be modulated by the main data signal b1 and the sub-data signal a to the optical fiber cable 2. The multiplexing of light intensity modulation is conducted by the direct modulation by a light emitting device 11 such as a laser diode. The digital optical signal Op supplied to the optical fiber cable 2 is further supplied to the optical receiver 3. Herein, the digital optical signal Op to be supplied to the optical receiver 3 has, as shown with oblique lines in FIG. 3, an offset since there may be DC light or scattered light caused by the light emitting device 11 or optical fiber cable 2 or the digital optical signal Op may include the sub-data signal a as a burst sinal with a clock rate quite lower than that of the main data signal b1.

By the photoelectric conversion circuit which comprises a photodetector (PD) 31 such as a photodiode and a pre-amplifier 32, the optical receiver 3 converts the supplied digital signal Op into a reproduced main data signal c1 and reproduced inversion main data signal c2 which are electric signals which can include direct current components. Namely, the photodetector 31 first converts the digital optical signal Op into the electric signal which can include the direct current component. Next, the DC-coupled pre-amplifier 32 which has a normal output terminal and an inverted output terminal amplifies the electric signal and outputs the reproduced main data signal c1 which is to be identical with the main data signal b1 at the normal output terminal and the reproduced inversion main data signal c2 which is the inversion signal of the reproduced main data signal c1 at the inverted output terminal. The reproduced main data signal c1 is output to a terminal 36, and the reproduced inversion main data signal c2 is output to a terminal 37.

Next, the optical receiver 3 has to reproduce a signal (reproduced sub-data signal) corresponding to the sub-data signal a while separating from the output signals of the pre-amplifier 32. Herein, the digital optical signal Op supplied to the optical receiver 3 has the offset during the ON period of the sub-data signal a since it includes a digital optical burst signal by the affection of the sub-data signal a. To prevent such offset from occurring in the reproduced main data signal c1 and reproduced inversion main data signal c2, the optical receiver 3 is provided with an automatic offset cancel (AOC) circuit 34 which can automatically cancel the offset (DC component) at the output of the pre-amplifier 32 to zero. The AOC circuit 34 can perform the automatic cancel control to make zero the DC component of an input signal, i.e., the DC component in the output from the pre-amplifier 32, by adding an offset control voltage d to the DC component of the electric signal supplied to the pre-amplifier 32.

The optical receiver 3 in the embodiment is provided with a low-pass filter (LPF) 33 inserted between the pre-amplifier 32 and the AOC circuit 34 to effectively take out the reproduced sub-data signal as mentioned above. LPF 33 has a function that subtracts the reproduced inversion main data signal c2 at the inverted output terminal from the reproduced main data signal c1 at the normal output terminal and a function that passes a frequency component lower than that of the main data signal b1 of the output signal of the pre-amplifier 32. Therefore, LPF 33 outputs a waveform similar to the sub-data signal a, which has an inverted polarity. Responding to the output of LPF 33, the AOC circuit 34 adds the offset control voltage d with a waveform similar to that of the sub-data signal a which varies to make the DC component at the output of LPF 33 zero, i.e., in the direction of canceling the offset, through a resistance R to the input terminal of the pre-amplifier 32. Thereby, the AOC circuit 34 can automatically cancel the offset similar to the sub-data signal a which may occur in the reproduced main data signal c1 and reproduced inversion main data signal c2. Herein, the input terminal of the pre-amplifier 32 is DC-coupled connected with the photodetector 31 added bias voltage by a positive power source Vcc.

As explained above, the offset control voltage d at the output of the AOC circuit 34 has the waveform similar to that of the sub-data signal a. An error amplifier 35 amplifies the offset control voltage d to output a reproduced sub-data signal e which is to be identical with the sub-data signal a to a terminal 38.

Next, the optical transmitter 1 will be in detail explained below. The light emitting device 11, one terminal of which is connected with the positive power source Vcc, is mainly driven by a transistor Tr2 at the other terminal to be light-intensity-modulated by the main data signal b1 and subordinately driven by a transistor Tr3 to be light-intensity-modulated multiplexing on the main data signal b1 by the sub-data signal a to generate the digital optical signal Op.

A transistor Tr1 and the transistor Tr2 forms a differential current switch, and their commonly connected emitters are grounded through a constant-current source 13 for current I1. The main data signal b1 is supplied to the base of the transistor Tr2, and the inverted main data signal b2 is supplied to the base of the transistor Tr1. The current I1 supplied from the collector of the transistor Tr2 to the light emitting device 11 defines the optical output power of the digital optical signal Op when not driven by the sub-data signal a. The collector of the transistor Tr2 is connected to the positive power source Vcc.

The base of the transistor Tr3 is supplied with the sub-data signal a and the collector thereof is connected with the other terminal of the light emitting device 11 and the emitter thereof is grounded through a constant-current source 12 for current I2. The optical output power of the digital optical signal Op is defined by the current (I1+I2) when the light emitting device is driven by the main data signal b1 and sub-data signal a.

In operation, when the driving current I1 of the light emitting device 11 is sufficiently greater than the driving current I2, the digital optical signal Op is, as shown in FIG. 3, has a waveform that the power of the main data signal b1 is sufficiently greater than that of the sub-data signal a (offset portion). Herein, the current I2 needs to be set such that the power of the sub-data signal a is not beyond the offset control range of the AOC circuit 34 in the optical receiver 3.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. An optical double transmission system for transmitting a digital optical signal from an optical transmitter through an optical fiber cable to an optical receiver, wherein:

said optical transmitter transmits a digital multiplexed light intensity signal which is modulated by a main data signal and a sub-data signal, said sub-data signal having a clock rate lower than that of said main data signal; and said optical receiver comprises a photoelectric conversion circuit for converting said light intensity signal into a first electric signal having a DC component, a low-pass filter for passing a frequency component lower than that of said main data signal of said first electric signal, an offset cancel circuit for controlling a value of the DC component of said first electric signal to be such that a DC component of the output of said low-pass filter is made zero responding to the output of said low-pass filter, and a sub-data signal reproducing circuit for reproducing said sub-data signal from the output of said offset cancel circuit.

2. An optical double transmission system, according to claim 1, wherein:

said photoelectric conversion circuit comprises a photodetector for converting said light intensity signal into a second electric signal and a pre-amplifier for amplifying said second electric signal to generate said first electric signal; and said offset cancel circuit offsets a DC component in the output of said low-pass filter by controlling a value of the DC component of said second electric signal.

* * * * *